United States Patent [19]

Meyer

[11] 4,221,263

[45] Sep. 9, 1980

[54] TUBE-TYPE VESSEL AND METHOD OF JOINING THE TUBES TO THE TUBESHEETS IN SUCH VESSELS

[75] Inventor: John J. Meyer, St. Louis, Mo.

[73] Assignee: Nooter Corporation, St. Louis, Mo.

[21] Appl. No.: 894,025

[22] Filed: Apr. 6, 1978

[51] Int. Cl.³ .............................................. F28F 9/18
[52] U.S. Cl. .................................... 165/173; 29/157.4; 219/60.2; 228/174; 228/183; 285/189
[58] Field of Search ............... 29/157.4; 285/189, 286; 228/174, 183; 219/60.2; 165/173–175, 178, 79

[56] References Cited

U.S. PATENT DOCUMENTS

| | | | |
|---|---|---|---|
| 3,205,340 | 9/1965 | Gotch | 29/157.4 |
| 3,440,391 | 4/1969 | Apblett | 219/60.2 |
| 3,473,215 | 10/1969 | Stevens | 228/165 |
| 3,670,140 | 6/1972 | Roberts | 29/157.4 |
| 3,769,489 | 10/1973 | Charlesworth | 219/60.2 |
| 4,066,861 | 1/1978 | Broodman | 29/60.2 |

FOREIGN PATENT DOCUMENTS

| | | | |
|---|---|---|---|
| 1143525 | 2/1963 | Fed. Rep. of Germany | 29/157.4 |
| 365587 | 12/1962 | Switzerland | 285/286 |
| 1222973 | 2/1971 | United Kingdom | 29/157.4 |
| 1332777 | 10/1973 | United Kingdom | 29/157.4 |

*Primary Examiner*—Sheldon Richter
*Attorney, Agent, or Firm*—Gravely, Lieder & Woodruff

[57] ABSTRACT

A tube-type vessel, such as a heat exchanger, has tubes that extend away from a tubesheet provided with holes which axially align with the tubes and open into the tube interiors. The diameter of each hole in the tubesheet is less than the outside diameter of the tube with which it aligns, but is greater than the inside diameter of the tube, thereby producing an offset between the inside surface of the tube and the surface of the hole. The tubes are attached to the tubesheet by welds, and each weld forms a fillet between exterior surface of its tube and the back face of the tubesheet and further forms a smooth beveled transition between the inside surface of the tube and the surface of the hole. The fillets eliminate the crevices that surround the tubes in conventional structures, and as a consequence no material will build up around the tubes and collapse them. To unite the tubes with the tubesheet, the latter at each hole is provided with a socket into which the end of a tube is fitted. The socket serves to precisely locate the tube with respect to the hole. Then the hole is welded autogenously to the tubesheet from within the hole. The weld completely penetrates the portion of the tube within the socket and further extends into the tubesheet, both radially beyond the circular side wall of the socket and axially beyond the base of the socket. In so doing, the fillet and smooth beveled transition are produced at the exterior and interior surfaces of the tube, respectively.

5 Claims, 9 Drawing Figures

TUBE-TYPE VESSEL AND METHOD OF JOINING THE TUBES TO THE TUBESHEETS IN SUCH VESSELS

BACKGROUND OF THE INVENTION

This invention relates in general to tube-type vessels and more particularly to such a vessel, the tubes of which are joined to the tubesheet in a unique manner, and to the process for attaching the tubes to the tubesheet.

In tube-type heat exchangers and other vessels used for industrial processes, the tubes extend between tubesheets and have their ends secured to the tubesheets. One fluid fills the cavity between the tubesheets and surrounds the outsides of the tubes, while another flows through the tubes, so that heat is transferred through the tube walls from the hotter fluid to the cooler fluid. Various procedures and equipment have been developed for fastening the tubes to the tubesheets.

In the typical heat exchanger (FIG. 1a) each tube extends through a separate hole in the tubesheet and has its end edge flush with front face of the tubesheet. Here, the two are welded together so that the weld exists along the end edge of the tube. Since the weld is at the front face of the tubesheet, a small annular crevice exists between the outer surface of the tube wall and the surrounding surface of the tubesheet hole into which the tube fits. In some applications, particularly where the fluid that circulates amongst the tubes is a liquid, the fluid enters the crevices surrounding the tubes and transforms into a solid deposit that builds up and contracts the tube wall at the crevice. In some instances the girdling effect is sufficiently great to completely collapse some of the tubes (FIG. 1a—left).

One way to eliminate crevice build up, and crevice corrosion as well, is to weld the tubes to the back face of the tubesheet so that no crevices exist at the joints between the tubes and tubesheets. This may be achieved by welding around the periphery of each tube from the exterior of the tube, but welding in the confined areas amongst numerous closely spaced tubes is not an easy procedure. Moreover, it requires specially bent electrodes that are configured to reach around the tubes. Also, the tubes must be positioned vertically so that they can be welded in a down hand position. This requires a great deal of head room—often more than is available in some shops.

Another possibility is to weld the tubes to the tubesheet from within the holes of the tubesheet. In this regard, welding heads are available that reach deep within small holes to produce circular welds which completely penetrate the tube walls. However, one cannot observe the welding electrode as it orbits within the hole.

If the outside diameter of the tube is the same as or slightly smaller than the diameter of the hole within the tubesheet (FIG. 1b), it is difficult to position the tube accurately with respect to the electrode of the welding head, and as a result the welds which are produced are often deficient. For example, the tube may locate so deeply within the hole that the resulting weld does not achieve sufficient penetration to eliminate the crevice (FIG. 1b—left). On the other hand, the tube may not extend far enough into the hole, in which case burnthrough might well occur (FIG. 1b—right). In short, the problem resides in the inability to precisely locate the tube in the hole.

The tube location problem may be overcome by making the holes in the tubesheets equal to the inside diameter of the tubes and providing the tubesheets at the end of the holes with sockets of predetermined depth for receiving the ends of the tubes (FIG. 1c). The tubes when fitted fully into the sockets are positioned precisely for welding from within the holes. While by this method it is possible to produce a fillet between the exterior surface of the tube and the backface of the tubesheet, the fillet takes metal away from the weld, leaving a depression and a cross-section that is thinner than desirable (FIG. 1c—left). The depression creates a weak point in the structure and may produce flow or other problems in some industrial processes. Also, a good possibility exists that at some locations around the joint, incomplete fusion will occur (FIG. 1c—right).

SUMMARY OF THE INVENTION

One of the principal objects of the present invention is to provide a tube-type heat exchanger or other vessel in which the tubes are welded to the tubesheet at the back face of the tubesheet, with each weld being exposed to the interior of the heat exchanger as a fillet so that no crevice whatsoever exists where the tube enters the tubesheet. Another object is to provide a heat exchanger in which a smooth transition exists between the inside surface of the tube and the tubesheet hole into which the interior of the tube opens so as not to disrupt the flow of fluid through the tube and tubesheet. A further object is to provide a heat exchanger in which the tubes are welded to the tubesheet from within the tubesheet holes. An additional object is to provide a heat exchanger which can be fabricated with orbiting type welding equipment that is currently available. Still another object is to provide a process for producing a heat exchanger of the type stated. Yet another object is to provide a process in which the tubes are precisely positioned from the tubesheet for producing an autogenous weld having an exterior fillet and proper cross-section. These and other objects and advantages will become apparent hereinafter.

The present invention is embodied in an improvement comprising a tubesheet having at least one hole and a tube welded to the tubesheet such that it aligns with the hole. The diameter of the hole is less than the outside diameter of the tube, but greater than the inside diameter of the tube so that an offset exists between the inside surface of the tube and the surface of the hole. The weld forms a fillet between the outside surface of the tube and the back face of the tubesheet. The invention also resides in the process of uniting the tube and tubesheet and that process includes forming a socket in the tubesheet around the hole, inserting the end of the tube in the socket, and welding the tube to the tubesheet such that the fillet is produced. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1A:
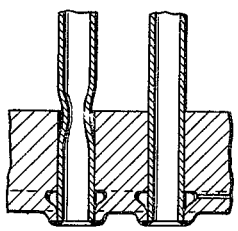
FIG. 1 is a sectional view showing a typical joint between a tubesheet and its tubes (FIG. 1a) as well as some attempts by applicant to eliminate the crevice problem (FIGS. 1b and 1c)
Figure 1B:
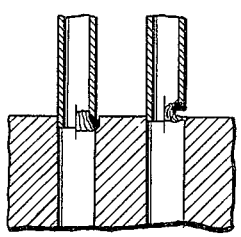
Figure 1C:
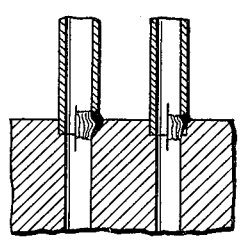
Figure 2:
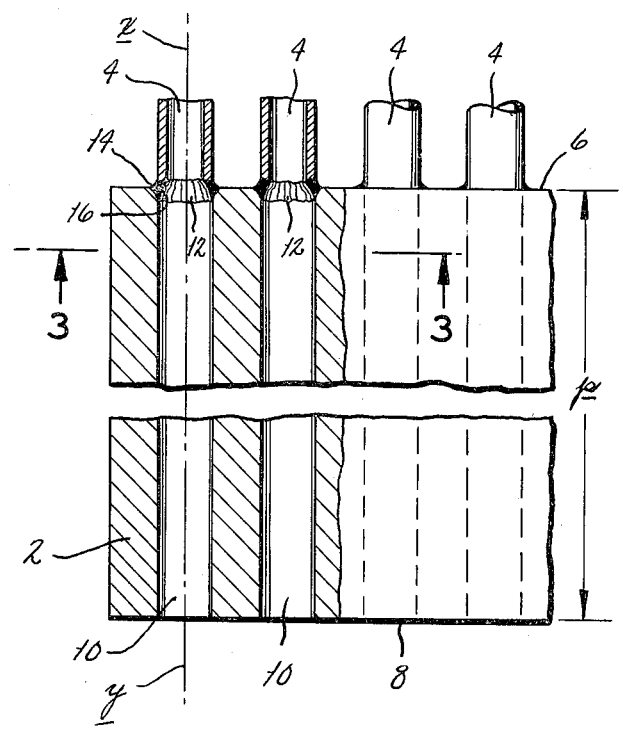
FIG. 2 is an elevational view, partially broken away and in section, of a tubesheet having tubes joined thereto in accordance with the present invention.
Figure 3:
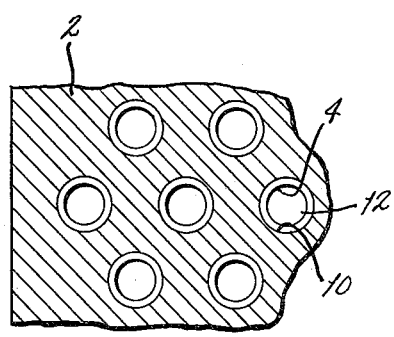
FIG. 3 is a fragmentary sectional view taken along line 3—3 of FIG. 2.

Referring now to the drawings (FIGS. 2–4), a heat exchanger or similar vessel has a tubesheet 2 to which a multitude of parallel tubes 4 are connected. The heat exchanger is constructed such that one fluid circulates around the exterior surfaces of the tubes 4 and behind the tubesheet 2, while a different fluid passes through the interiors of the tubes 4. The tubes 4 and the tubesheet 2 separate the two fluids from each other, yet permit heat to transfer from the hotter fluid to the cooler fluid.

Figure 5:
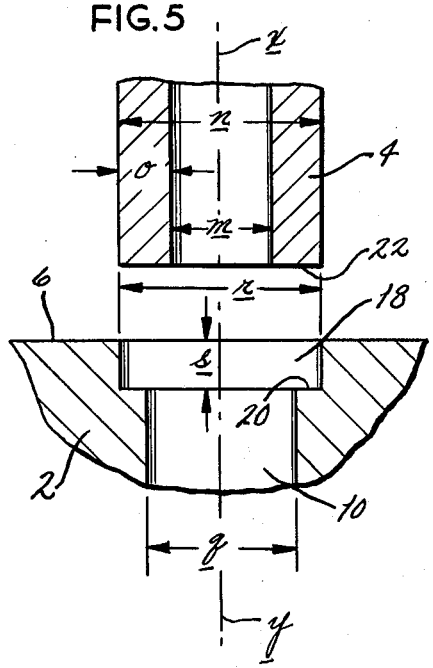
FIG. 5 is a sectional view illustrating the tubesheet prior to having the tube welded to it, with the tube being removed from its socket in the tubesheet.

The tubes 4 are straight and of uniform circular cross-section, each having (FIG. 5) an inside diameter m, an outside diameter n, and a wall thickness o which is equal to one-half the difference between the diameters m and n. The axes x of the tubes 4 are parallel and perpendicular to the tubesheets 4.

The tubesheet 2 (FIG. 2) is flat and has a back face 6 which is exposed to the fluid that circulates around the tubes 4 and a front face 8 which is exposed to the fluid that passes through the tubes 4. The thickness p of the tubesheet 2 may range between ¼ and 20 inches. Opening out of the front face 8 of the tubesheet 2 are a multitude of closely spaced holes 10 which are of uniform diameter q and extend practically all the way through the tubesheet. The axes y of the holes 10 are coincident with the axes x of the tubes 4, or, in other words, each hole 10 axially aligns with a different tube 4. Indeed, the end of each tube 4 is welded to the tubesheet 2 along a fillet weld 12 which surrounds the end of the hole 10 which with that tube 4 aligns. Thus, the holes 10 open into the interiors of the tubes 4. The fillet welds 12 are at the back face 6, and each forms a fillet 14 (FIGS. 2 & 4) between back face 6 of the tubesheet 2 and the exterior surface of the tube 4 which it secures to the tubesheet 2. Within the tubesheet 2, each fillet weld 12 has a beveled surface 16 which forms a smooth transition between the inside surface of the tube 4 and the surface of the hole 10. As a consequence, no crevices whatsoever exist between the tubesheet 2 and the tubes 4. The diameter q of the holes 10 is less than the outside diameter n of the tubes 4, but is greater than the inside diameter n of tubes 4, so that the flow passage formed by each hole 10 and its corresponding tube 4 undergoes a change in diameter at the weld 12. This change, however, is not abrupt by reason of the smooth transition formed by the beveled surface 16.

Figure 6:
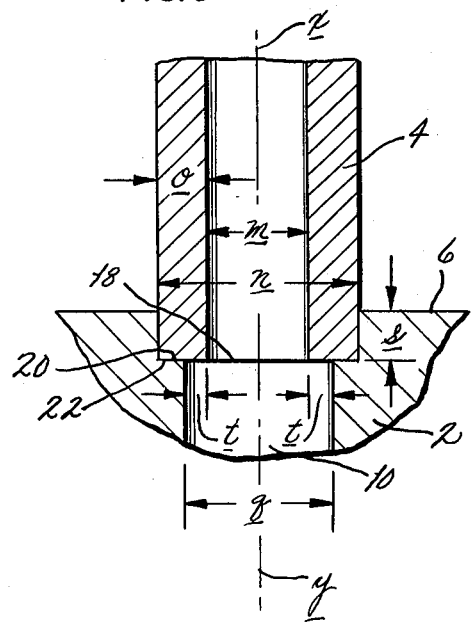
FIG. 6 is a sectional view illustrating the tubesheet prior to having the tube welded to it, but with the tube in its socket in the tubesheet.

To fabricate the heat exchanger A the tubesheet 2 is machined to provide the parallel back and front faces 6 and 8. Then the holes 10 are drilled perpendicular to the faces 6 and 8. Thereafter, each hole 10 is counterbored from the back face 6 to provide a circular socket 18 (FIG. 5) which is concentric about the axis y for its hole 10. Each socket 18 inwardly terminates at a shoulder 20 which is squared off with respect to the common axis y of the hole 10 and socket 18. The sockets 18 have a diameter r and a depth s, the latter being the distance from the back face 6 to the shoulder 20. The diameter r of the sockets 18 is equal to or slightly larger than the outside diameter n of the tubes 4, so that the tubes 4 will fit easily into the holes 10. In this regard, each tube 4 initially has an end face 22 which is squared off with respect to the axes x of the tube 4, so that when the tube 4 is inserted to its fullest extent into the socket 18, the end face 22 of that tube 4 will abut against the shoulder 20 for the socket 18 (FIG. 6). The depth s of the socket 18 should range between 30% and 120% of the wall thickness o of the tube 4 and should preferably be equal to the wall thickness o. Thus, the socket 18 precisely locates the end of the tube 4, both radially and axially, with respect to the hole 10.

Since diameter of the hole 10 is greater than the inside diameter m of the tube 4, an offset t (FIG. 6) will exist between the inside surface of the tube 4 and the surface of the hole 10. In other words, a portion of the squared off end face 22 of the tube 10 will project inwardly from the surface of the hole 10 and will be exposed from the outer end of the hole 10. The offset t should be sufficient to provide a smooth transition between the inside surface of the tube 4 and the surface of the hole 10 when the weld 12 is formed and will vary according to the wall thickness o. Normally, the offset t should range between 40% and 60% of the wall thickness o for the tube 4 and should preferably equal 50% of the wall thickness o.

Figure 7:
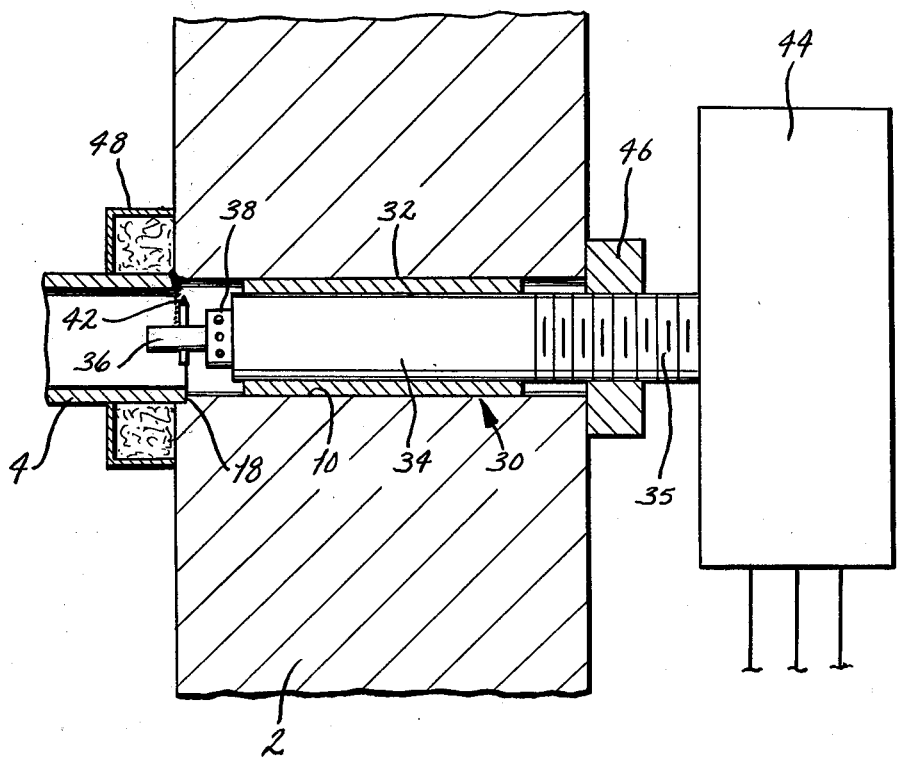
FIG. 7 is a sectional view showing the welding equipment used to join the tube to the tubesheet and its location in the hole of the tubesheet during welding.

Once the end of the tube 4 is installed in the socket 14 with its end face 18 abutting the shoulder 16 of the counterbore 14, the tube 4 and tubesheet 2 are welded together autogenously, that is without the addition of filler (FIG. 7). This is best achieved with a tube welder capable of welding the tube 4 to the tubesheet 2 from within the hole 10. Welding equipment having the capability of welding deep within small diameter holes is currently available on the market. Since the weld 12 is autogenous, the end of the tube 4, the socket 18, the adjoining end of the hole, and the back face 6 must be perfectly clean.

One welding machine suitable for joining the tubes 4 to tubesheet 2 includes a welding head 30 (FIG. 7) provided with a mandrel 32 that fits into the hole 10 in the tubesheet 2. The fit between the mandrel 32 and the hole 10 is relatively snug, yet is not so tight as to prevent easy insertion into and removal from the hole 10. The mandrel 32 is short enough to fit completely within the hole 10 without interfering with the area to be welded. Extended through the mandrel 32 is a hollow sleeve 34 having threads 35 at its one end. The sleeve 34 receives a spindle 36 that projects beyond the opposite end where it is provided with a nozzle 38 for discharging an inert gas and an electrode holder 40 that carries a radially directed electrode 42 made from tungsten or some other electrical conductor that is capable of withstanding intense heat. The head 30 contains a drive motor 44 that rotates the spindle 36 within the sleeve 34, and as the spindle 36 revolves, the tip of the electrode 42 orbits within the hole 10. The depth at which the electrode 42 locates within the hole 10 is controlled by a collar 46 that threads over the threads 36 on the sleeve 34 and abuts against the front face 8 of the tubesheet 2. The sleeve 34 is formed from a dielectric material so as to electrically isolate the spindle 36 from the tubesheet 2.

The head 30 through suitable conduits and conductors is connected to an electrical power supply, a source of inert gas, and a source of cooling water, with the arrangement being such that a direct current welding potential is impressed across the space between the tip of the electrode 42 and the end face 22 of the tube 4, that inert gas is discharged through the nozzle 38, and that cooling water is circulated through the spindle 36.

Before energizing the welding machine B, the electrode 42 is adjusted inwardly or outwardly on the spindle 36 to place it the proper distance from the surface of the hole 10. Likewise the collar 46 is rotated over the sleeve 34 to locate the tip of the electrode 42 the proper axial distance from the end face 22 of the tube 4. Next, the drive motor 44 is energized, causing the spindle 36 to revolve. The tip of the electrode 42 of course orbits in close proximity to the offset or inwardly projected portion of the end face 22. Also cooling water is circulated through the spindle 36, while an inert gas is discharged from the nozzle 38. The gas fills the interior of the hole 10 and tube 4, displacing air therefrom, and some of it escapes through the socket 14 and along the side of the tube 4. Any inert gas that escapes passes into a purge cup 48 located around the portion of the tube 4 that is adjacent to the back face 6 of the tubesheet 2. Indeed, the purge cup 48 is connected to its own source of inert gas, so that the portion of the back face 6 surrounding the counterbore 14 as well as the adjoining exterior surface of the tube 4 are all in an atmosphere of inert gas.

Figure 4:
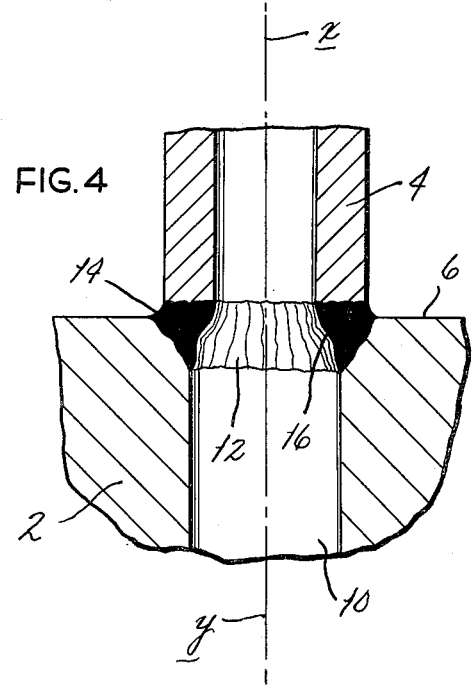
FIG. 4 is an enlarged sectional view of a joint between a tube and its tubesheet and made in accordance with the present invention.

Finally, the power supply is energized to impress a direct current potential across the gap between the end face of the tube 4 and the electrode 42 of the welding head 30. The potential is of sufficient magnitude to produce an arc that bridges the gap, and this arc and resulting current flow heat the end of the tube 4 and the portion of the tubesheet 2 surrounding the counterbore 14 sufficiently to melt the two and fuse them together in the formation of the fillet weld 12. Indeed, the intensity of the arc and the magnitude of the welding current are great enough to completely melt all of the tube 4 within the socket 18 as well as the adjoining portion of the tube 4 located outside of the counterbore 14, and to further extend the fusion into the tubesheet 2 both radially beyond the side wall of the socket 18 and axially beyond the shoulder 20. The result is the filler weld 12 having the small fillet 14 at the juncture of the back face 6 and the exterior surface of the tube 4 and the beveled surface of the hole 10 (FIG. 4). The fillet weld 12 develops as the tip of the electrode 42 orbits within the hole 10 of the tubesheet 2, so slightly in excess of one complete revolution of the spindle 36 is required to produce the complete weld 12. The weld 12 may be formed with the tube 4 in vertical, horizontal, or inclined positions.

Of course, since the weld 12 is formed autogenously, the metal of the tube 4 must be compatible with the metal of the tubesheet 2 from a welding standpoint. This may be achieved by providing the tubesheet 2 with a weld metal overlay at its back face 6, and the depth that overlay should exceed the depth of the weld 12. Hence the counterbore 14 in that instance is formed completely in the overlay. Similarly, clad plate could be used for the tubesheet 2.

This invention is intended to cover all changes and modifications of the example of the invention herein chosen for purposes of the disclosures which do not constitute departures from the spirit and scope of the invention.

What is claimed is:

1. In a vessel such as a heat exchanger, the improvement comprising: a tubesheet having a front face, a flat back face and a plurality of closely spaced circular holes exposed from the front face of the tubesheet; and circular tubes joined to the tubesheet at the holes, there being a separate tube aligned with each hole such that the axis of a tube and the axis of its corresponding hole are coincident and the interior of the tube opens into the hole, as to each tube the outside diameter of the tube being greater than the diameter of the hole with which it aligns and the inside diameter of the tube being less than the diameter of the hole so that an offset exists between the inside surface of the tube and the surface of the hole, with the offset ranging between 40% and 60% of the wall thickness for the tube, the end of the tube initially being received in a circular socket formed in the tubesheet with the socket opening out of the back face of the tubesheet and having its axis coincident with the axis of the hole and tube, the depth of the socket being between 30% and 120% of the thickness of the tube wall, the tube being joined to the tubesheet by a weld that is formed autogenously in a single pass from within the hole, the weld completely penetrating the end of the tube within the socket and extending both radially beyond the circular surface of the socket and axially beyond the base of the socket to completely obliterate the socket, the weld forming a fillet between the exterior surface of the tube and the back face of the tubesheet, so that no crevice surrounds the tube at the location where it enters the tubesheet, and further forming a beveled transition beteen the interior surface of the tube and the surface of the hole.

2. The improvement according to claim 1 wherein the axes of the holes and tubes are perpendicular to the flat back face of the tubesheet; and each tube is aligned with a different hole such that the axis of the tube and the axis of the hole with which the tube is aligned are coincident.

3. A process for attaching tubes of circular cross-section to a tubesheet having a front face and a back face, said process comprising: providing the tubesheet with a plurality of closely spaced circular holes each having its one end exposed from the front face of the tubesheet, the diameter of the holes being less than the outside diameter of the tubes and greater than the inside diameter of the tubes; providing the tubesheet with circular sockets that surround the opposite ends of the holes and open out of the back face of the tubesheet, each socket being axially aligned with its corresponding hole and further being equal to or slightly greater in diameter than the tubes so as to easily receive the end of a tube, the depth of the socket being between 30% and 120% of the thickness of the tube walls; as to each hole, inserting the end of the tube for that hole in the socket at the end of the hole such that the tube wall substantially fills the socket, whereby the inside surface of the tube will be offset inwardly from the surface of the hole; and from within each hole welding the tube for that hole to the tubesheet at the socket autogenously by rotating a nonconsumable electrode through about one revolution within the hole in the region of the socket, all such that the weld so formed completely penetrates the end of the tube within the socket and extends into the tubesheet both radially beyond the circular wall of the socket and axially beyond the base of the socket to completely obliterate the walls of the socket, the weld further creating a fillet between the exterior surface of the tube and the back face of the tubesheet and a beveled transition between the inside surface of the tube and the surface of the hole, whereby no crevice exists between the tube and the tubesheet and a smooth transition exists between the hole and the interior of the tube.

4. The process according to claim 3 wherein the offset between the inside surface of each tube and the surface of the hole for that tube ranges between about 40% and 60% of the thickness of the tube wall.

5. The process according to claim 3 wherein the back face of the tubesheet is planar and the holes in the tubesheet and the tubes have their axes parallel and perpendicular to the back face of the tubesheet.

* * * * *